United States Patent

Kortz

[11] Patent Number: 5,883,915
[45] Date of Patent: Mar. 16, 1999

[54] LONGITUDINALLY PUMPED LASER

[75] Inventor: Hans-Peter Kortz, Pansdorf, Germany

[73] Assignee: Adlas GmbH & Co. KG, Lübeck, Germany

[21] Appl. No.: 648,563

[22] Filed: May 16, 1996

[30] Foreign Application Priority Data

May 16, 1995 [DE] Germany ............... 195 17 963.3

[51] Int. Cl.$^6$ ............... H01S 3/091; H01S 3/092
[52] U.S. Cl. ............................. 372/71; 372/75
[58] Field of Search ......................... 372/71, 75

[56] References Cited

U.S. PATENT DOCUMENTS

| | | | |
|---|---|---|---|
| 4,446,556 | 5/1984 | Koepf ........................... | 372/71 |
| 5,081,630 | 1/1992 | Lowenthal et al. .............. | 372/71 |
| 5,084,840 | 1/1992 | Kozlovsky et al. . | |
| 5,111,468 | 5/1992 | Kozlovsky et al. ............. | 372/75 |
| 5,124,999 | 6/1992 | Okazaki et al. ................. | 372/75 |
| 5,216,679 | 6/1993 | Tamura et al. .................. | 372/71 |
| 5,365,366 | 11/1994 | Kafka et al. .................... | 372/71 |
| 5,436,920 | 7/1995 | Minemoto et al. . | |
| 5,513,205 | 4/1996 | Rubinstein ...................... | 372/71 |

FOREIGN PATENT DOCUMENTS

| | | |
|---|---|---|
| 58-132 709 | 8/1983 | Japan . |
| 60-00 0411 | 1/1985 | Japan . |
| 30 93 285 | 4/1991 | Japan . |
| 43 55 705 | 12/1992 | Japan . |
| 51 83 220 | 7/1993 | Japan . |
| 52 43 650 | 9/1993 | Japan . |
| 61 20 597 | 4/1994 | Japan . |
| 61 60 930 | 6/1994 | Japan . |
| 609 75 45 | 8/1994 | Japan . |
| 70 86 668 | 3/1995 | Japan . |
| 70 99 360 | 4/1995 | Japan . |
| 2 245 378 | 1/1992 | United Kingdom . |

*Primary Examiner*—Rodney Bovernick
*Assistant Examiner*—Robert E. Wise
*Attorney, Agent, or Firm*—Cohen, Pontani, Lieberman & Pavane

[57] ABSTRACT

A longitudinally pumped laser including a pumping module having a pumped light source and an input optic, and a resonator having a first reflecting surface serving as an input mirror, a laser medium and a second reflecting surface serving as an output mirror. In order to avoid impairment of the operation of the pumped light source by retroreflected pumped light and/or by leakage radiation from the resonator, without appreciably worsening the adaptation of the pumped light ray to the mode volume of the laser, the pumping module and the resonator are so disposed relative to each other that a first optical axis defined by the pumped light source and input optic defines with a second optical axis defined by the resonator a predetermined angle of intersection greater than 0° and less than about 15°, and more preferably in the range of about 0.05° and about 1°.

20 Claims, 3 Drawing Sheets

LONGITUDINALLY PUMPED LASER

BACKGROUND OF THE INVENTION

1. Field of the Invention

The present invention relates to a longitudinally pumped laser including a pumping module with a pumped light source and an input optic, and a resonator with an input mirror, a laser medium and an output mirror. The term "longitudinally pumped laser" denotes that the pumped light produced by the pumped light source is coupled to the resonator in an orientation parallel or at least approximately parallel to the direction of the laser beam produced by the laser. The light may be coupled, for example, by the input mirror of the resonator.

2. Description of Related Art

U.S. Reissue Pat. No. Re. 34,729 discloses (as shown in FIG. 2a thereof) a laser of the type wherein the pumped light source, input optic and resonator are disposed on a common optical axis. In such a laser all components are usually adjusted so that the path of the pumped light ray between the pumped laser and the mode volume of the pumped laser is optimally adapted so that the pumped light from the laser is absorbed in this mode volume as completely as possible.

A drawback of this arrangement is that pumped light can be retroreflected to the pumped light source by the surface of the resonator facing the pumping module. Furthermore, a portion of the light produced by the laser can exit the resonator as leakage radiation through the first reflecting surface and likewise impinge on the pumped light source. This retroreflected pumped light and/or leakage radiation of the laser can impair the functioning of the pumped light source. The impinging radiation causes heating of the pumped light source, which can influence the intensity and wavelength of the pumped light and damage or even destroy the pumped light source.

If the pumped light source is a laser, specifically a laser diode, and the retroreflected pumped light hits the active surface of the pumped light source (pumping laser), an additional resonator can form between the exit surface of the pumping laser and the entrance surface of the pumped laser. This additional resonator will be unstable and disturb the modes of the pumping laser, causing its power and wavelength to fluctuate and thus resulting in impaired functioning of the pumped laser.

If the pumped laser operates in pulsed mode, the leakage radiation can reach very great intensity even at a very small leakage rate of the resonator and lead to damage or destruction of the pumped light source.

U.S. Pat. No. 5,315,613 discloses a diode-pumped solid-state laser wherein the optical axis of the laser diode serving as a pumped light source is shifted parallel to the optical axis of the input optic. This is intended to reduce the light retroreflected to the laser diode. A drawback of this arrangement is that the acentric transmission of the input optic leads to image defects which can have an adverse effect on the coupling of the pumped ray into the mode volume. Pumped light sources (specifically laser diodes) are generally produced as a single unit with a corresponding input optic adjusted centrically to the pumped light ray. Acentrically adjusted input optics require elaborate special production of the pumping module, which increases costs.

European Patent No. 632 551 A1 discloses a solid-state laser having a resonator constructed from an output mirror and an end mirror disposed therebeside as well as a crystal serving as a laser medium disposed opposite these two mirrors. The side of the crystal facing away from the mirrors is metalized and the crystal is mounted with this metalized face on a cooling surface. If the laser is to be pumped approximately longitudinally, the pumped light must be irradiated into the surface of the crystal facing the two mirrors. Since the pumped light source can only be disposed at the side of the two mirrors, irradiation is possible only at a certain angle to the optical axis of the resonator (see FIG. 21 of EP 632 551 A1). In this known laser, irradiation of the pumped light at an angle to the optical axis of the resonator thus necessarily results from the arrangement of the other components and is not used for the purpose of keeping reflected pumped light away from the pumped light source. Quite the contrary, the mirror (element 202) shown in FIG. 21 of EP 632 551 A1 causes the pumped light reflected from the surface of the crystal to be retroreflected into the pumped light source.

SUMMARY OF THE INVENTION

The desideratum of the invention is to provide a longitudinally pumped laser which allows the pumped light source to function unimpaired by retroreflected pumped light and/or by leakage radiation of the resonator and without appreciably worsening the adaptation of the pumped light ray to the mode volume of the laser.

The present invention provides a pumped light laser which disposes the pumping module and the resonator relative to each other in such a way that a first optical axis defined by the pumped light source and the input optic defines, intersectingly with a second optical axis defined by the resonator, an angle therebetween which is greater than 0° and smaller than about 15°.

In another embodiment of the invention, the deficiencies of the prior art are overcome by disposing, between the pumped light source and the resonator, a filter that is largely pervious to the pumped light and largely impervious to one or more wavelengths produced by the laser.

A further solution to deficiencies of the prior art is to select or define the geometric shape of the input mirror so that a perpendicular ray projecting from the surface of the input mirror facing the pumping module defines with an optical axis defined by the resonator, an angle therebetween which is greater than 0° and smaller than about 15°. A combination of these solutions can also be used.

The advantage of the present invention lies in the fact that, owing to the angle defined by the optical axis of the pumping module with the optical axis of the resonator, pumped light reflected from the input mirror of the resonator does not double back on itself and cannot impair the functioning of the pumped light source so long as the angle is sufficiently large.

Laser radiation leaving the resonator as leakage radiation through the input mirror likewise fails to impair the pumped light source.

The minimal angle required for this purpose depends on the distance between the pumped light source and input optic, the distance between the input optic and resonator, the focal length and free aperture of the input optic, and the size of the surface of the pumped light source sensitive to irradiated light. Under suitable optical and geometric conditions, an angle of as small as 0.05° will suffice.

A very large angle between the two optical axes worsens the adaptation of the pumped light ray to the mode volume of the laser. The size of the angle at which this occurs depends substantially on the ratio of the diameters of the pumped light ray and mode volume and on the absorption length of the pumped light ray in the laser medium. Angles of up to about 15° can be used. An angle of at most about 1° between the two optical axes has no adverse effect on the adaptation of the pumped ray to the mode volume of the laser even under unfavorable optical conditions.

To prevent leakage radiation of the laser from reaching the pumped light source, the present invention also advantageously provides a filter disposed in the ray path between the resonator and pumped light source and which prevents the pumped light source from being impaired by leakage radiation.

The present invention also provides an advantageous combination of the several embodiments described above. This combination can be used, for example, when leakage radiation from the input mirror no longer directly hits the pumped light source but instead hits the input optic. Light deflected or scattered by the input optic can then again impair the pumped light source. The described filter will prevent this effect.

In a further embodiment of the invention, the direction of pumped radiation can remain approximately parallel to the direction of the optical axis without retroreflecting pumped light into the pumped light source. Adaptation of the pumped light ray to the mode volume is barely affected. For additionally blocking leakage radiation of the laser, one can supplement this further embodiment of the invention with a filter disposed between the resonator and pumped light source.

One can also implement the filter as a component of the input optic by, for example, forming one surface of the input optic as an interference filter.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference numerals denote similar elements throughout the several views.

DETAILED DESCRIPTION OF THE PRESENTLY PREFERRED EMBODIMENTS

Figure 1:
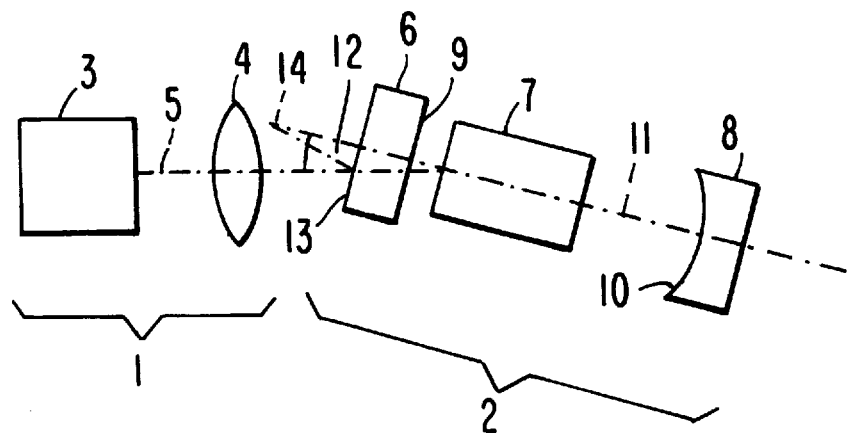
FIG. 1 depicts a laser constructed in accordance with the invention and wherein the optical axes of the pumping module and the resonator define an angle therebetween.

The embodiment of the inventive laser shown in FIG. 1 is formed of a pumping module 1 and a resonator 2. The pumping module is constructed of a pumped light source 3 and an input optic 4. The pumped light source in this first embodiment is, by way of example, a laser diode. Pumped light source 3 and input optic 4 define a first optical axis 5 along which the pumped light from pumped light source 3 is projected. Resonator 2 is formed of an input mirror 6, a laser medium 7 and an output mirror 8. Pumped light passes through input mirror 6 into resonator 2, exciting the latter to produce laser radiation which leaves resonator 2 partly through output mirror 8. Input mirror 6 is pervious to the pumped radiation and largely impervious to the wavelengths produced by the laser. Side 9 of the input mirror 6 facing laser medium 7 is a first reflecting surface of the laser and, by way of example in this embodiment, forms a flat plane. Laser medium 7 in this embodiment is, for example, an Nd:YAG crystal. Surface 10 of the output mirror 8 facing laser medium 7 defines a second reflecting surface that is, for example, concave in this embodiment.

Alternatively, the invention can readily be implemented in this and all its other contemplated embodiments as having a concave input mirror 6 and a flat planar output mirror 8.

The resonator defines a second optical axis 11 along which the light amplified by the laser spreads or projects. Pumping module 1 and resonator 2 are adjusted relative to each other so that the first optical axis 5 and second optical axis 11 define therebetween an angle of intersection 12. The angle 12 is greater than 0° and smaller than about 15° and, in most preferred forms of the invention, is between about 0.05° and about 1°.

The fraction 14 of the pumped light reflected from the surface 13 of input mirror 6 facing pumping module 1 is deflected by twice the angle 12 out of the direction of the pumped light ray and thus no longer passes or is reflected onto sensitive parts of the pumped light source 3. If the angle 12 is large, the reflected light is even guided right past the pumping module 1.

Figure 2:
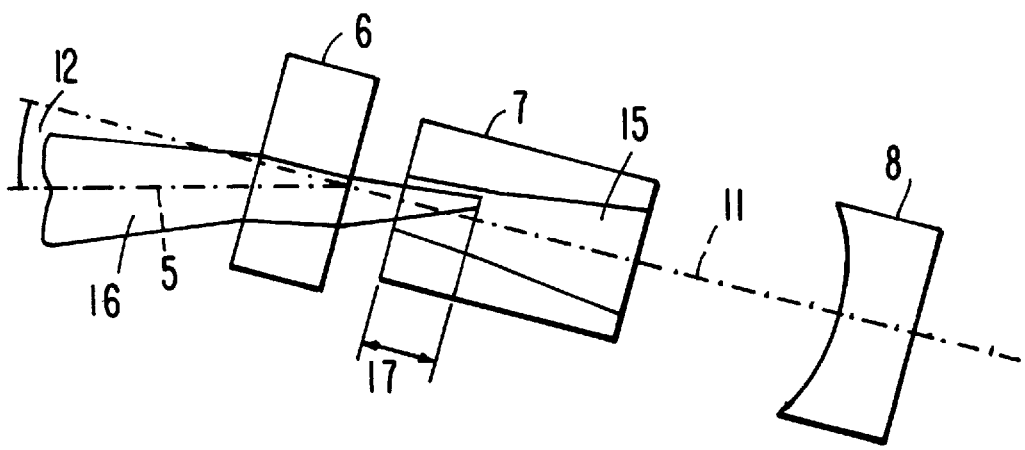
FIG. 2 depicts an enlarged detail of the laser of FIG. 1.

FIG. 2 shows an enlarged detail of FIG. 1 including the input mirror 6, laser medium 7 and output mirror 8. The mode volume 15 is indicated in laser medium 7. Pumped radiation 16 passes through input mirror 6 into mode volume 15 and is there absorbed. For high efficiency of the laser it is important that the pumped radiation 16 be absorbed in mode volume 15 as completely as possible. If the angle 12 is not selected to be too large in relation to the diameter of mode volume 15, the diameter of pumped ray 16 and the distance referred to as the absorption length 17, in which about 95% of the pumped light is absorbed in the laser medium, almost complete absorption of the pumped light in the mode volume is possible.

Figure 3:
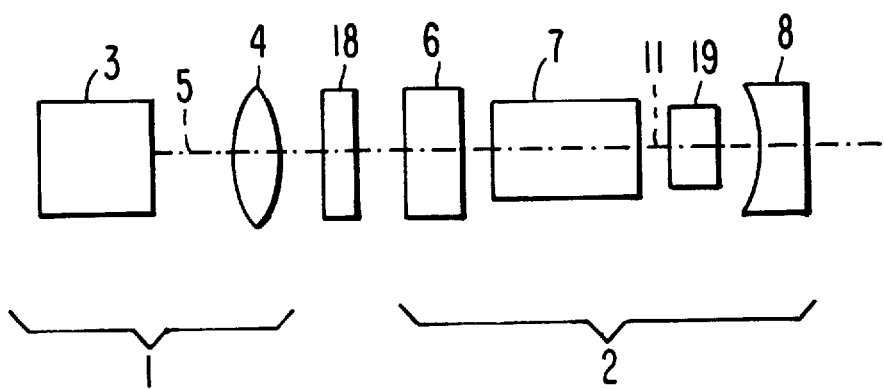
FIG. 3 depicts a laser in accordance with the invention and in which a filter is disposed between the pumped light source and resonator.

FIG. 3 depicts a further embodiment of the invention in which the two optical axes 5, 11 are coincident or identical. A filter 18 is disposed between the input optic 4 and input mirror 6. In resonator 2, a nonlinear crystal 19 is additionally disposed for frequency doubling, the crystal 19 being included by way of example only and not constituting a necessary element of the invention. The structure of the FIG. 4 embodiment otherwise conforms to that of FIG. 1. The filter is implemented so that it is as pervious as possible to the wavelengths of the pumped light but transmits the wavelengths emitted by the laser as little as possible. It may, for example, be formed as an interference filter, and have a transmission factor of more than approximately 80% for the pumped radiation, and a transmission factor of less than approximately 20% for the laser radiation. Laser light which passes input mirror 6 as leakage radiation is thus stopped by filter 18 and cannot therefore damage the pumped light source.

Figure 4:
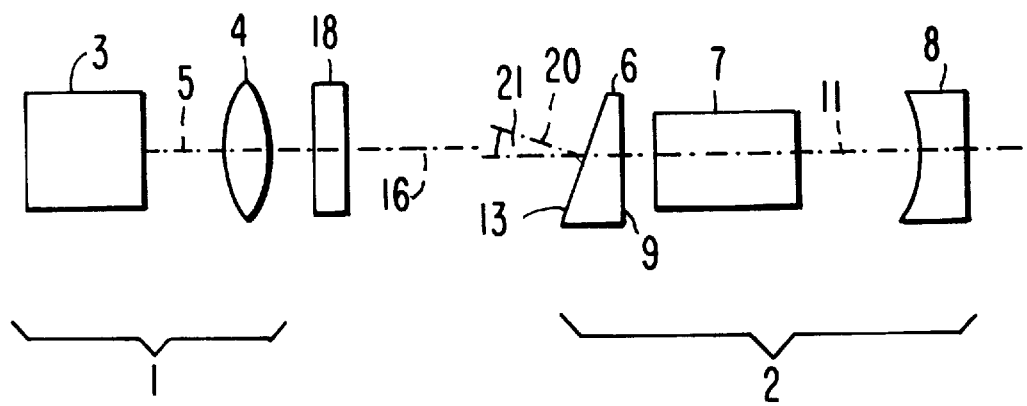
FIG. 4 depicts a further embodiment of a laser in accordance with the invention and wherein a perpendicular ray projecting from the input mirror and the optical axis of the resonator define an angle therebetween.

FIG. 4 shows a still further embodiment of the invention in which the input mirror 6 is prismatic. Metalized surface 9 of input mirror 6 is oriented perpendicular to the optical axis 11 of the laser. A perpendicular axis 20 extending perpendicular to the surface 13 of input mirror 6 facing pumping module 1 defines an angle of intersection 21 with the optical axis 11. A pumped light ray 16 hits the surface 13 along an axis defined perpendicular to but, in a preferred form of the invention, slightly offset from the optical axis 11 of the laser, thereby preventing reflected pumped light from impairing the pumped light source 3, as in the embodiment of FIG. 1.

Figure 5:
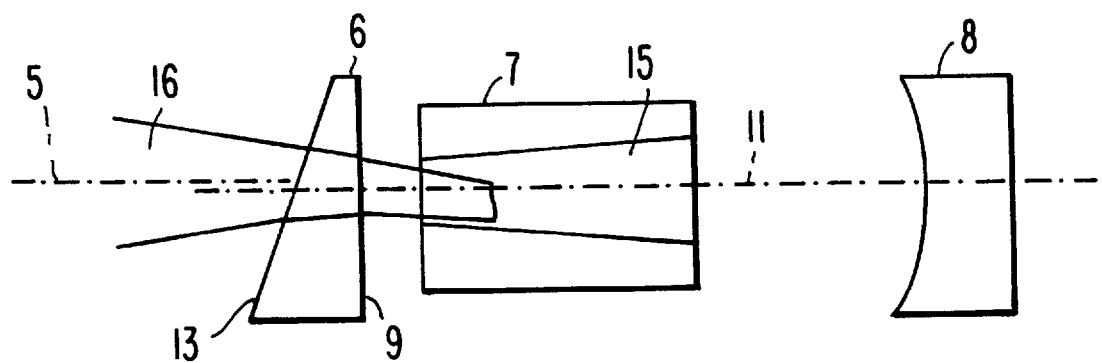
FIG. 5 depicts an enlarged detail of the laser of FIG. 4.

FIG. 5 depicts an enlarged detail of the embodiment of FIG. 4 including the input mirror 6, laser medium 7 and output mirror 8. The pumped ray 16 hits the surface 13 of input mirror 6 at a position offset from the laser optical axis 11 and the intersection of the perpendicular axis 20 with the surface 13, is refracted, passes through the metalized surface 9 whereby it is refracted again, and is then absorbed in mode volume 15. The conditions for virtually complete absorption herein above described with respect to the embodiment of FIG. 1 equally apply in this further embodiment.

In all embodiments, the input mirror 6 can also be formed as a concave mirror and the output mirror 8 as a flat planar mirror, or both may be formed as concave mirrors. In the latter case, the decisive angle in the embodiment of FIG. 4 is that existing between the surface facing pumping module 1 and the tangent to the concave surface at the traversal point of the optical axis 11 of the resonator through input mirror 6.

Also in all embodiments, additional components may be disposed in the laser, such as a nonlinear crystal 19 for frequency multiplication, and components can form a unit with each other. It is possible, for example, to work the end faces of the laser medium 7 accordingly and use them as input and output mirrors.

Thus, while there have shown and described and pointed out fundamental novel features of the invention as applied to several preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

I claim:

1. A longitudinally pumped laser, comprising:
   a pumping module comprising a pumped light source and an input optic;
   a resonator comprising an input mirror, a laser medium and an output mirror;
   a first optical axis defined by said pumped light source and said input optic; and
   a second optical axis defined by said resonator and oriented relative to said first optical axis so as to intersect said first optical axis and define between and at said intersection of said first and second optical axes a predetermined angle between about 0.05° and about 1°.

2. A longitudinally pumped laser in accordance with claim 1, wherein said pumped light source comprises at least one laser diode.

3. A longitudinally pumped laser in accordance with claim 1, wherein said laser medium comprises a solid.

4. A longitudinally pumped laser in accordance with claim 3, wherein said solid comprises a doped crystal.

5. A longitudinally pumped laser in accordance with claim 1, further comprising a non-linear crystal for frequency doubling.

6. A longitudinally pumped laser, comprising:
   a pumping module comprising a pumped light source and an input optic;
   a resonator comprising an input mirror having a surface facing said pumping module and defining a ray extending perpendicularly outward from said surface, a laser medium and an output mirror; and
   an optical axis defined by said resonator and intersecting said ray to define between and at said intersection of said optical axis and ray a predetermined angle in a range between about 0.05° and 1°.

7. A longitudinally pumped laser in accordance with claim 6, wherein said pumped light source comprises at least one laser diode.

8. A longitudinally pumped laser in accordance with claim 6, wherein said laser medium comprises a solid.

9. A longitudinally pumped laser in accordance with claim 8, wherein said solid comprises a doped crystal.

10. A longitudinally pumped laser in accordance with claim 6, further comprising a non-linear crystal for frequency doubling.

11. A longitudinally pumped laser, comprising:
    a pumping module for emitting pumped light along a first optical axis and comprising a pumped light source for emitting the pumped light and an input optic in said first optical axis and through which the pumped light from said pumped light source is directed;
    a resonator for producing at least a wavelength of light in response to receipt of the pumped light from said pumping module, said resonator comprising an input mirror having a surface on which pumped light from the pumping module impinges and through which the pumped light from said pumping module enters said resonator, a laser medium for producing said at least a wavelength of light and an output mirror, and defining a second optical axis through said input mirror, laser medium and output mirror, said input mirror surface being at least one of configured and oriented so that pumped light from the pumping module impinging on said surface and reflected therefrom is reflected along a path extending outwardly from said input mirror surface and defining with said first optical axis a selectively predetermined angle greater than 0° and less than about 15° and selected so as to prevent contact of said reflected pumped light with said input optic of said pumping module; and
    filter disposed in said first optical axis between said pumped light source and said resonator, said filter being substantially pervious to the pumped light from said pumped light source and substantially impervious to at least one wavelength of said at least one wavelength of light produced by said resonator.

12. A longitudinally pumped laser in accordance with claim 11, wherein said resonator is oriented so that said path of reflected pumped light from said input mirror surface is coincident with said second optical axis of the resonator.

13. A longitudinally pumped laser in accordance with claim 12, wherein said input mirror surface comprises a substantially flat plane.

14. A longitudinally pumped laser in accordance with claim 11, wherein said input mirror surface comprises a substantially flat plane.

15. A longitudinally pumped laser in accordance with claim 11, wherein said input mirror surface has a concave configuration.

16. A longitudinally pumped laser in accordance with claim 11, further comprising a non-linear crystal disposed in said second optical path for frequency doubling of said at least one wavelength of light produced by said laser medium.

17. A longitudinally pumped laser in accordance with claim 11, wherein said first optical axis of the pumping module is oriented substantially parallel to and offset from said second optical axis of the resonator.

18. A longitudinally pumped laser, comprising:

a pumping module comprising a pumped light source and an input optic;

a resonator comprising an input mirror having a surface facing said pumping module and defining a ray extending perpendicularly outward from said surface, a laser medium and an output mirror;

an optical axis defined by said resonator and intersecting said ray to define between and at said intersection of said optical axis and ray a predetermined angle greater than 0° and small than about 15°; and a filter disposed between said pumped light source and said resonator, said filter being substantially pervious to pumped light from said pumped light source and substantially impervious to a wavelength of light produced by said laser medium.

19. A longitudinally pumped laser, comprising:

a pumping module comprising a pumped light source and an input optic;

a resonator comprising an input mirror having a surface facing said pumping module and finding a ray extending perpendicularly outward from said surface, a laser medium and an output mirror; and an optical axis defined by said resonator and intersecting said ray to define between and at said intersection of said optical axis and ray a predetermined angle greater than 0° and smaller than about 15°, at least one element of said input optic comprising a filter substantially pervious to pumped light from said pumped light source and substantially impervious to a wavelength of light produced by said laser medium.

20. A longitudinally pumped laser, comprising:

a pumping module for emitting pumped light along a first optical axis and comprising a pumped light source for emitting the pumped light and an input optic in said first optical axis and through which the pumped light from said pumped light source is directed; and a resonator for producing at least a wavelength of light in response to receipt of the pumped light from said pumping module, said resonator comprising an input mirror having a surface on which pumped light from the pumping module impinges and through which the pumped light from said pumping module enters said resonator, a laser medium for producing said at least a wavelength of light and an output mirror, and defining a second optical axis through said input mirror, laser medium and output mirror, said input mirror surface being at least one of configured and oriented so that pumped light from the pumping module impinging on said surface and reflected therefrom is reflected along a path extending outwardly from said input mirror surface and defining with said first optical axis a selectively predetermined angle greater than 0° and less than about 15° and selected so as to prevent contact of said reflected pumped light with said input optic of said pumping module, said input optic comprising a plurality of elements and at least one element of said input optic comprising a filter substantially pervious to the pumped light from said pumped light source and substantially impervious to at least one wavelength of said at least one wavelength of light produced by said resonator.

* * * * *